(12) United States Patent
Santra et al.

(10) Patent No.: US 11,261,363 B2
(45) Date of Patent: Mar. 1, 2022

(54) METHODS OF SUSPENDING WEIGHTING AGENTS IN A DRILLING FLUID

(71) Applicant: Saudi Arabian Oil Company, Dhahran (SA)

(72) Inventors: Ashok Santra, The Woodlands, TX (US); Peter J. Boul, Houston, TX (US); Carl Thaemlitz, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/832,250

(22) Filed: Mar. 27, 2020

(65) Prior Publication Data

US 2020/0332170 A1    Oct. 22, 2020

Related U.S. Application Data

(60) Provisional application No. 62/835,136, filed on Apr. 17, 2019.

(51) Int. Cl.
*C09K 8/18* (2006.01)
*E21B 21/06* (2006.01)
*E21B 37/08* (2006.01)

(52) U.S. Cl.
CPC .............. *C09K 8/18* (2013.01); *E21B 21/068* (2013.01); *E21B 37/08* (2013.01)

(58) Field of Classification Search
CPC ...... C09K 8/18; C09K 2208/10; C09K 8/032; E21B 21/068; E21B 37/08; C01P 2004/13; C01B 32/956; C01B 32/162
See application file for complete search history.

(56) References Cited

U.S. PATENT DOCUMENTS

| | | | |
|---|---|---|---|
| 4,663,230 A | 5/1987 | Tennett | |
| 6,177,396 B1 * | 1/2001 | Clapperton | C11D 1/83 510/405 |
| 6,787,505 B1 * | 9/2004 | Maitland | C09K 8/34 507/103 |
| 6,900,580 B2 | 5/2005 | Dai et al. | |
| 7,799,246 B2 | 9/2010 | Bordere et al. | |
| 7,968,184 B2 | 6/2011 | Humphreys et al. | |
| 8,075,799 B2 | 12/2011 | Hong et al. | |
| 8,469,118 B2 | 6/2013 | Passade-Boupat et al. | |
| 8,763,695 B2 | 7/2014 | van Zanten | |
| 8,790,615 B2 | 7/2014 | Viswanathan | |
| 9,777,132 B2 | 10/2017 | Kverel et al. | |
| 9,987,608 B2 | 6/2018 | Pigos | |
| 10,190,370 B1 | 1/2019 | Taha et al. | |
| 2006/0078489 A1 | 4/2006 | Harutyunyan et al. | |
| 2006/0177659 A1 | 8/2006 | Chen et al. | |
| 2007/0140951 A1 | 6/2007 | O'Brien et al. | |
| 2010/0105834 A1 | 4/2010 | Tour et al. | |
| 2010/0224129 A1 * | 9/2010 | Malecki | B01J 35/0013 118/723 R |
| 2010/0239489 A1 | 9/2010 | Harutyunyan et al. | |
| 2010/0243236 A1 | 9/2010 | Koons | |
| 2010/0300759 A1 | 12/2010 | Passade-Boupat et al. | |
| 2011/0011157 A1 | 1/2011 | Bourlon et al. | |
| 2011/0060162 A1 | 3/2011 | Tatsuhara et al. | |
| 2011/0089958 A1 | 4/2011 | Malecki et al. | |
| 2011/0107942 A1 | 5/2011 | Eleto Da Silva et al. | |
| 2011/0254553 A1 | 10/2011 | van Zanten | |
| 2012/0015852 A1 | 1/2012 | Quintero et al. | |
| 2012/0018155 A1 | 1/2012 | Patil et al. | |
| 2012/0042806 A1 | 2/2012 | Hersam et al. | |
| 2013/0213638 A1 | 8/2013 | Keller et al. | |
| 2013/0217603 A1 | 8/2013 | Jamison et al. | |
| 2014/0096964 A1 | 4/2014 | Chakraborty et al. | |
| 2014/0367091 A1 | 12/2014 | Tour et al. | |
| 2015/0153472 A1 | 6/2015 | Tour et al. | |

(Continued)

FOREIGN PATENT DOCUMENTS

CN  104962276 B  3/2019
GB  2520018 A  5/2015

(Continued)

OTHER PUBLICATIONS

Al-Rekabi, "Use of Carbon Nanofilaments in Producing Cementitious Composites with Improved Mechanical and Durability Performance", Thesis submitted Sep. 2017.
Azhari et al., "Cement-based sensors with carbon fibers and carbon nanotubes for piezoresistive sensing", Cement & Concrete Composites, vol. 34, pp. 866-873,2012.
Cervantes-Sodi et al., "Selective synthesis of double helices of carbon nanotube bundles grown on treated metallic substrates", Physics Status Solidi (b), vol. 249, No. 12, pp. 2382-2385, 2012.
Cwirzen et al., "CHH Cement Composite", Cement & Concrete Research, Jan. 2009.
D'Alessandro et al., "Self-sensing and thermal energy experimental characterization of multifunctional cement-matrix composites with carbon nano-inclusions", Behavior and Mechanics of Multifunctional Materials and C omposites Proceedings vol. 9800, 2016.

(Continued)

*Primary Examiner* — Kumar R Bhushan
(74) *Attorney, Agent, or Firm* — Dinsmore & Shohl

(57) ABSTRACT

The methods of suspending at least one weighting agent in a drilling fluid include synthesizing carbon nanotubes via chemical vapor deposition on iron oxide catalyst nanoparticles to form a quantity of nanoparticles. Individual nanoparticles of the iron oxide catalyst nanoparticles include a transition metal disposed on iron oxide. The embodiments further include adding a quantity of nanoparticles to the drilling fluid which results in an amount of carbon nanotubes dispersed within the drilling fluid. The dispersion of the quantity of nanoparticles increases the value of at least one of a Newtonian viscosity, a yield point, a plastic viscosity, and a density of the drilling fluid with the dispersed nanoparticles versus a similar or equivalent drilling fluid without the nanoparticle dispersion. The method may further include adding at least one weighting agent which will become suspended in the drilling fluid.

18 Claims, 1 Drawing Sheet

(56) References Cited

U.S. PATENT DOCUMENTS

| | | | |
|---|---|---|---|
| 2015/0284619 A1 | 10/2015 | Price Hoelscher et al. | |
| 2016/0017202 A1* | 1/2016 | Yang | C09K 8/82 166/250.01 |
| 2016/0258269 A1 | 9/2016 | Musso et al. | |
| 2017/0327729 A1 | 11/2017 | Salla et al. | |
| 2018/0306027 A1 | 10/2018 | Sherman et al. | |

FOREIGN PATENT DOCUMENTS

| | | | |
|---|---|---|---|
| JP | 03174341 A | | 7/1991 |
| RU | 2015129136 A | | 1/2017 |
| WO | WO03/004155 | * | 1/2003 |
| WO | 2006137942 A2 | | 12/2006 |
| WO | 2007093725 A2 | | 8/2007 |
| WO | 2011128615 A1 | | 10/2011 |
| WO | 2012085516 A2 | | 6/2012 |
| WO | 2012114068 A2 | | 8/2012 |
| WO | 2013008209 A2 | | 1/2013 |
| WO | 2014060686 A1 | | 4/2014 |
| WO | 2015038117 A1 | | 3/2015 |
| WO | 2015077524 A1 | | 5/2015 |
| WO | 2017152298 A1 | | 9/2017 |
| WO | 2018048569 A1 | | 3/2018 |
| WO | 2018101545 A1 | | 6/2018 |

OTHER PUBLICATIONS

D'Alessandro et al., "Static Dynamic Strain Monitoring of Reinforced Concrete Components through Embedded Carbon Nanotube Cement-Based Sensors", Hindawi, Shock and Vibration, vol. 2017, Article ID 3648403, 11 pages, Aug. 7, 2017.

Falikman et al., "Nanotechnologies in New Structural Concretes: Practice and Outlook", Concrete, Innovation and Desibn, fib Symposium, Cophenhagen, May 18-20, 2015.

Khalil et al., "Advanced nanomaterials in oil and gas industry: Design, application and challenges", Applied Energy 191, pp. 287-310, 2017.

Lamesh, et al., "Effect of the Support on Structure of the Multi-Walled Carbon Nanotubes Grown by CCVD over Nickel Nanoparticles", Journal of Advances in Nanomaterials, vol. 2, No. 3, Sep. 2017.

Mangadlao et al., "Smart cements and cement additives for oil and gas operations", Journal of Petroleum Science and Engineering, vol. 129, pp. 63-76, 2015.

Ning, et al., "Improvement of Fe/MgO Catalysts by Calcination for the Growth of Single- and Double-Walled Carbon Nanotubes", J. Phys. Chern., vol. 110, No. 3, pp. 1201-1205, 2006.

Sanchez et al., "Nanotechnology in concrete—A review", Construction and Building Materials, vol. 24, pp. 2060-2071, 2010.

Tragazikis et al., "Acoustic emission investigation of the mechanical performance of carbon nanotube-modified cement-based mortars", Construction and Building Materials, vol. 122, pp. 518-524, 2016.

Ubertini et al., Natural Frequencies Identification of a Reinforced Concrete Beam using Carbon Nanobube Cement-based Sensors, Engineering Structures, vol. 60, pp. 265-275, Feb. 2014.

Zolotarev et al., "Impact Resistance of Cement and Gypsum Plaster Nanomodified by Water-Soluble Fullerenols", Industrial & Engineering Chemistry Research, vol. 52, p. 14583-14591, 2013.

International Search Report and Written Opinion dated Jul. 1, 2020 pertaining to International application No. PCT/US2020/026103 filed Apr. 1, 2020,18 pgs.

International Search Report and Written Opinion dated Jul. 1, 2020 pertaining to International application No. PCT/US2020/026871 filed Apr. 6, 2020, 18 pgs.

International Search Report and Written Opinion dated Jul. 10, 2020 pertaining to International application No. PCT/US2020/024917 filed Mar. 26, 2020, 13 pgs.

International Search Report and Written Opinion dated Jul. 16, 2020 pertaining to International application No. PCT/US2020/028077 filed Apr. 14, 2020, 17 pgs.

Gomez et al., "Proppant immobilization facilitated by carbon nanotube mediated microwave treatment of polymer-proppant structures" Colloids and Surfaces A: Physiochemical and Engineering Aspects, Elsevier, Amsterdam, NL, vol. 513, Oct. 27, 2016, pp. 297-305.

Orbaek, Alvin W. et al., "The development of a 'process map' for the growth of carbon nanomaterials from ferrocene by injection CVD" Journal of Materials Chemistry A, vol. 1, No. 25, Jan. 1, 2013, p. 14122.

Gomez et al. "Enhanced purification of carbon nanotubes by microwave and chlorine cleaning procedures" RSC Advances, vol. 6, No. 14, Jan. 1, 2016, p. 11895-11902.

Eftekhari et al., "High-yield synthesis of carbon nanotubes using a water-soluble catalyst support in catalytic chemical vapor deposition" Carbon, Elsevier, Oxford, GB, vol. 44, No. 7, Jun. 1, 2006, pp. 1343-1345.

International Search Report and Written Opinion dated Nov. 5, 2020 pertaining to International application No. PCT/US2020/043219 filed Jul. 23, 2020, 13 pgs.

U.S. Office Action dated Sep. 23, 2021 pertaining to U.S. Appl. No. 16/832,218, filed Mar. 27, 2020, 24 pages.

U.S. Office Action dated Oct. 14, 2021 pertaining to U.S. Appl. No. 16/832,279, filed Mar. 27, 2020, 42 pages.

U.S. Office Action dated Nov. 10, 2021 pertaining to U.S. Appl. No. 16/934,637, filed Jul. 21, 2020, 35 pages.

Nasibulin, A.G et al. "A novel cement-based hybrid material" New Journal of Physics, 11 (2009), 023013, pp. 1-12.

Chang, L. W et al. "Magnetic Properties of Multi-Walled Carbon Nanotubes" Journal of Nanoscience and Nanotechnology, vol. 9(3), pp. 1956-1963, 2009.

* cited by examiner

METHODS OF SUSPENDING WEIGHTING AGENTS IN A DRILLING FLUID

CROSS-REFERENCE TO RELATED APPLICATIONS

This application claims the benefit of U.S. Provisional Application Ser. No. 62/835,136 filed Apr. 17, 2019, the entire disclosure of which is hereby incorporated herein by reference.

TECHNICAL FIELD

The disclosure generally relates to drilling fluid, its manufacture and its use.

BACKGROUND

Drilling fluids in the oil and gas industries perform a myriad of tasks, including cleaning a well, holding cuttings in suspension, reducing friction, lubricating the drilling tools, maintaining stability of a wellbore, and preventing fluid loss, to name a few. Weighting agents may be suspended in a drilling fluid to increase the density of the drilling fluid.

SUMMARY

However, the ability of conventional drilling fluids to effectively suspend and carry cuttings and weighting agents decreases as the temperature of the drilling fluid increases due to decreasing Newtonian viscosity, yield point, plastic viscosity, and density of the drilling fluid and thermal thinning of the drilling fluid.

Conventional drilling fluids that suspend solid materials, such as cuttings and weighting agents, encounter difficulties as the solids separate from the liquid and settle in the wellbore. This phenomenon is commonly referred to as "sag." Sag typically occurs when the flow of drilling fluid through the wellbore is stopped for a period of time, during which the drilling fluid is static. Sag may also occur due to decreased flow or annular velocity of the drilling fluid. Sag may also be worsened by reduced Newtonian viscosity, yield point, plastic viscosity, and density or reduced gel strength drilling fluids, reduced shear rate conditions, and greater downhole temperatures. Settling of the solid material may cause variations in the density of drilling fluid throughout the wellbore. For example, the drilling fluid in the bottom of the wellbore may have a greater density due to settling of the solids towards the bottom of the wellbore caused by gravity. Likewise, the drilling fluid near the surface may have a lesser density. Sag conditions may lead to stuck pipe conditions, reductions in the hole-cleaning ability of the drilling fluid, or combinations of these. The hole-cleaning ability of a drilling fluid refers to the ability of the drilling fluid to capture rock cuttings from the drilling zone and convey them to the surface of the wellbore.

Therefore, it is often desirable to use drilling fluids with increased Newtonian viscosity, yield point, plastic viscosity, or density, and therefore increased ability to suspend solid materials. Furthermore, drilling fluids with increased Newtonian viscosity, yield point, plastic viscosity, or density may have less thermal thinning as temperature increases as compared to drilling fluids with reduced Newtonian viscosity, yield point, plastic viscosity, or density. Conventionally, carbon nanotubes have been added to drilling fluids to increase at least one of the Newtonian viscosity, the yield point, the plastic viscosity, and the density of the drilling fluid. However, current methods of adding carbon nanotubes to drilling fluids result in clumps within the drilling fluid, as carbon nanotubes are conventionally added to the drilling fluid as a batch. Drilling fluids with groups of clumped carbon nanotubes do not suspend weighting agents as effectively as drilling fluids with dispersed carbon nanotubes. Although various techniques have been used to try to disperse clumped carbon nanotubes, such as ultra-sonication, or adding surfactants or polymers into the drilling fluid, none have resulted in dispersed carbon nanotubes.

Accordingly, an ongoing need exists for drilling fluids with increased Newtonian viscosity, yield point, plastic viscosity, or density and reduced thermal thinning of the drilling fluid with the dispersed nanoparticles versus a similar or equivalent drilling fluid without the nanoparticle dispersion. The present embodiments address these needs by providing methods of suspending at least one weighting agent in a drilling fluid including dispersed nanoparticles. The drilling fluids of the present disclosure may address these needs by providing improved rheology characteristics to drilling fluids, such as increased Newtonian viscosity, yield point, plastic viscosity, or density and decreased thermal thinning of the drilling fluid with the dispersed nanoparticles versus a similar or equivalent drilling fluid without the nanoparticle dispersion.

In one embodiment, the present disclosure relates to a method of suspending at least one weighting agent in a drilling fluid. The embodiments include synthesizing carbon nanotubes via chemical vapor deposition on iron oxide catalyst nanoparticles to form a quantity of nanoparticles. Individual nanoparticles of the iron oxide catalyst nanoparticles include a transition metal disposed on iron oxide. The embodiments further include adding a quantity of nanoparticles to the drilling fluid which results in an amount of carbon nanotubes dispersed within the drilling fluid. The dispersion of the quantity of nanoparticles increases the value of at least one of a Newtonian viscosity, a yield point, a plastic viscosity, and a density of the drilling fluid with the dispersed nanoparticles versus a similar or equivalent drilling fluid without the nanoparticle dispersion. The method may further include adding at least one weighting agent which will become suspended in the drilling fluid. The weighting agent may be chosen from the group consisting of barite, hematite, lime, calcium carbonate, bentonite, montmorillonite clay, siderite, ilmenite, hausmannite, ferrosilicon, manganese oxide, mullite, kaolinite, aluminum oxide, silicon carbide, tungsten carbide, and combinations of these.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWINGS

The following detailed description of specific embodiments of the present disclosure may be best understood when read in conjunction with the following drawings, where like structures are indicated with like reference numerals and in which.

DETAILED DESCRIPTION

Figure 1:
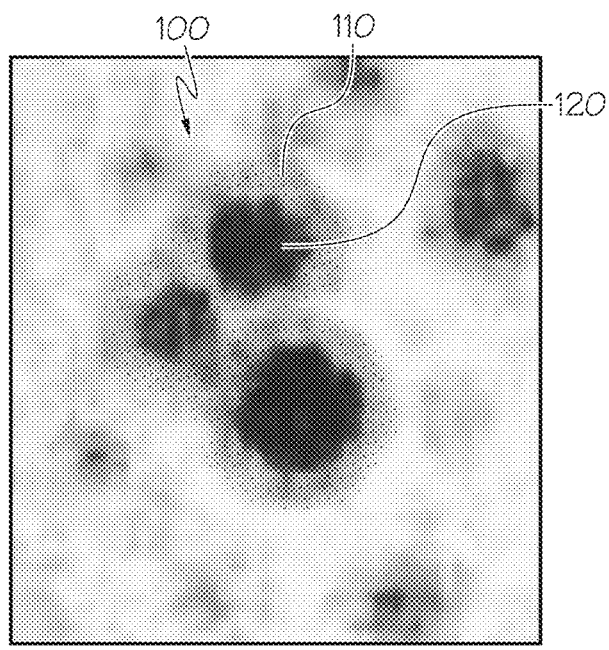
FIG. 1 photographically depicts iron oxide catalyst nanoparticles, according to one or more embodiments described in this disclosure.

As used throughout the disclosure, "aqueous" refers to a fluid containing, producing, resembling, or having the properties of water.

As used throughout this disclosure, the term "drilling fluid" refers to liquid and gaseous fluids and mixtures of fluids and solids (as solid suspensions, mixtures and emulsions of liquids, gases and solids) used in operations to drill wellbores.

As used throughout this disclosure, the term "lithostatic pressure" refers to the pressure of the weight of overburden, or overlying rock, on a subsurface formation.

As used throughout this disclosure, the term "Newtonian viscosity" refers to the apparent viscosity of a fluid measured at a given rotor speed of a rotational viscometer. The Newtonian viscosity may be measured by multiplying the dial reading of the viscometer by 300, and dividing that product by the rotor speed in revolutions per minute (RPM).

As used throughout this disclosure, the term "oleaginous" refers to a fluid containing, producing, resembling, or having the properties of oil.

As used throughout this disclosure, the term "producing subsurface formation" refers to the subsurface formation from which hydrocarbons are produced.

As used throughout this disclosure, the term "reservoir" refers to a subsurface formation having sufficient porosity and permeability to store and transmit fluids.

As used throughout this disclosure, the term "subsurface formation" refers to a body of rock that is sufficiently distinctive and continuous from the surrounding rock bodies that the body of rock may be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "weighting agent" refers to an additive used to increase density of a drilling fluid.

As used throughout this disclosure, the term "wellbore" refers to the drilled hole or borehole, including the open-hole or uncased portion of the well. Borehole may refer to the inside diameter of the wellbore wall, the rock face that bounds the drilled hole.

Embodiments of the present disclosure are directed to methods of suspending at least one weighting agent in drilling fluids. The embodiments include adding a quantity of nanoparticles to the drilling fluid which results in an amount of carbon nanotubes dispersed within the drilling fluid. The dispersion of the quantity of nanoparticles increases the value of at least one of a Newtonian viscosity, a yield point, a plastic viscosity, and a density of the drilling fluid with the dispersed nanoparticles versus a similar or equivalent drilling fluid without the nanoparticle dispersion. The method may further include adding at least one weighting agent which will become suspended in the drilling fluid. The weighting agent may be chosen from the group consisting of barite, hematite, lime, calcium carbonate, bentonite, montmorillonite clay, siderite, ilmenite, hausmannite, ferrosilicon, manganese oxide, mullite, kaolinite, aluminum oxide, silicon carbide, tungsten carbide, and combinations of these.

In another embodiment, the method may include synthesizing carbon nanotubes via chemical vapor deposition on iron oxide catalyst nanoparticles to form a quantity of nanoparticles. Individual nanoparticles of the iron oxide catalyst nanoparticles include a transition metal disposed on iron oxide. The method includes adding the quantity of nanoparticles to the drilling fluid. The drilling fluid includes at least one surfactant. Adding the quantity of nanoparticles to the drilling fluid results in the quantity of nanoparticles dispersed within the drilling fluid. The dispersion of nanoparticles increases the value of at least one of the Newtonian viscosity, the yield point, the plastic viscosity, and the density of the drilling fluid with the dispersed nanoparticles versus a similar or equivalent drilling fluid without the nanoparticle dispersion. The method may further include adding at least one weighting agent which will become suspended in the drilling fluid. Other embodiments of the present disclosure include drilling fluids including carbon nanotubes and at least one weighting agent. Further embodiments include methods of using the drilling fluids by pumping the drilling fluid into a subterranean formation. In some embodiments, the drilling fluid is pumped into a drill string. The embodiments may further include circulating the drilling fluid in the subterranean formation. Still further embodiments include a method for increasing a rate of hydrocarbon production from a subsurface formation.

The drilling fluids of the present disclosure may be used in the oil and gas drilling industries, such as for drilling in oil and gas wells. Oil and gas wells may be formed in subterranean portions of the Earth, sometimes referred to as subterranean geological formations. The wellbore may serve to connect natural resources, such as petrochemical products, to a ground level surface. Drilling fluid may be utilized during the drilling process. To remove the rock cuttings from the bottom of the wellbore, drilling fluid is pumped down through the drill string to the drill bit. The drilling fluid may cool the drill bit and lift the rock cuttings away from the drill bit and may carry the rock cuttings upwards as the drilling fluid is recirculated back to the surface. The drilling fluid serves several functions in the drilling process. The drilling fluid may provide lubrication and may cool the drill bit. The drilling fluid may also transport rock cuttings from the drill bit to the surface. This may be referred to as cleaning the wellbore. Additionally, the drilling fluid may provide hydrostatic pressure in the wellbore. This provides support to the sidewalls of the wellbore and prevents the sidewalls from collapsing and caving in on the drill string. The drilling fluid may also prevent fluids in the downhole formations from flowing into the wellbore during drilling operations.

To accomplish these functions, the drilling fluid may be formulated to have specific characteristics. These characteristics may include increased Newtonian viscosity, yield point, plastic viscosity, density, solids content, pump-ability and hole-cleaning capability of the drilling fluid with the dispersed carbon nanotubes versus a similar or equivalent drilling fluid without the carbon nanotube dispersion. In particular, the drilling fluid may be formulated to have a density in a range suitable to provide the necessary hydrostatic pressure to support the sidewalls of the wellbore and prevent fluids in the formation from flowing into the wellbore. Additionally, the drilling fluids may be formulated to have specific rheological properties that allow the drilling fluid to be pumped down through the drill string while still capturing and conveying rock cuttings from the drill bit to the top of the wellbore. In some embodiments, the drilling fluids may include solid particles suspended in a base fluid. The solid particles, sometimes referred to as a weighting agent, may increase the density of the drilling fluid to help the drilling fluid support the sidewalls of the wellbore as well as increase the hydrostatic pressure to keep fluids from the formation from flowing into the wellbore. In other embodiments, the drilling fluids may be able to provide the necessary hydrostatic pressure without the use of solid particles to increase the density of the fluid.

As stated previously, the drilling fluid includes carbon nanotubes. The carbon nanotubes include at least one of single-walled nanotubes, double-walled nanotubes, narrow-walled nanotubes, or bundle of nanotubes. The carbon nanotubes may have a diameter of from 1 to 200 nanometers (nm), from 20 to 100 nm, from 10 to 80 nm, from 4 to 20 nm, from 2 to 12 nm, from 2 to 10 nm, from 2 to 9 nm, from 2 to 8 nm, from 2 to 7 nm, from 2 to 6 nm, from 2 to 5 nm, from 2 to 4 nm, from 2 to 3 nm, 3 to 12 nm, from 3 to 10 nm, from 3 to 9 nm, from 3 to 8 nm, from 3 to 7 nm, from 3 to 6 nm, from 3 to 5 nm, from 3 to 4 nm, 4 to 12 nm, from 4 to 10 nm, from 4 to 9 nm, from 4 to 8 nm, from 4 to 7 nm, from 4 to 6 nm, from 4 to 5 nm, 5 to 12 nm, from 5 to 10 nm, from 5 to 9 nm, from 5 to 8 nm, from 5 to 7 nm, from 5 to 6 nm, 6 to 12 nm, from 6 to 10 nm, from 6 to 9 nm, from 6 to 8 nm, from 6 to 7 nm, 7 to 12 nm, from 7 to 10 nm, from 7 to 9 nm, from 7 to 8 nm, 8 to 12 nm, from 8 to 10 nm, from 8 to 9 nm, 9 to 12 nm, from 9 to 10 nm, from 10 to 12 nm, or of 8 nm.

The carbon nanotubes may have a length of from 20 to 500 microns (μm), 20 to 200 μm, 20 to 150 μm, 20 to 100 μm, 50 to 500 μm, from 50 to 200 μm, from 50 to 150 μm, from 50 to 100 μm, from 100 to 500 μm, from 100 to 200 μm, from 100 to 150 μm, from 150 to 500 μm, from 150 to 200 μm, or from 200 to 500 μm; an aspect ratio (calculated by dividing the length of the carbon nanotube by the diameter of the carbon nanotube) of from 100 to 50,000, from 500 to 30,000, from 1,000 to 20,000, from 1,000 to 100,000, from 1,000 to 50,000, from 1,000 to 40,000, from 1,000 to 30,000, from 1,000 to 25,000, from 1,000 to 20,000, from 1,000 to 15,000, from 1,000 to 12,000, from 1,000 to 10,000, from 1,000 to 8,000, from 8,000 to 100,000, from 8,000 to 50,000, from 8,000 to 40,000, from 8,000 to 30,000, from 8,000 to 25,000, from 8,000 to 20,000, from 8,000 to 15,000, from 8,000 to 12,000, from 8,000 to 10,000, from 10,000 to 100,000, from 10,000 to 50,000, from 10,000 to 40,000, from 10,000 to 30,000, from 10,000 to 25,000, from 10,000 to 20,000, from 10,000 to 15,000, from 10,000 to 12,000, from 12,000 to 100,000, from 12,000 to 50,000, from 12,000 to 40,000, from 12,000 to 30,000, from 12,000 to 25,000, from 12,000 to 20,000, from 12,000 to 15,000, from 15,000 to 100,000, from 15,000 to 50,000, from 15,000 to 40,000, from 15,000 to 30,000, from 15,000 to 25,000, from 15,000 to 20,000, from 20,000 to 100,000, from 20,000 to 50,000, from 20,000 to 40,000, from 20,000 to 30,000, from 20,000 to 25,000, from 25,000 to 100,000, from 25,000 to 50,000, from 25,000 to 40,000, from 25,000 to 30,000, from 30,000 to 100,000, from 30,000 to 50,000, from 30,000 to 40,000, from 40,000 to 50,000, from 40,000 to 100,000, or from 50,000 to 100,000.

The carbon nanotubes may have a specific surface area of from 100 to 12,000 square meter per gram ($m^2/g$), from 100 to 10,000 $m^2/g$, from 100 to 800 $m^2/g$, from 100 to 700 $m^2/g$, from 400 to 12,000 $m^2/g$, from 400 to 10,000 $m^2/g$, from 400 to 800 $m^2/g$, from 100 to 1,500 $m^2/g$, from 120 to 1,000 $m^2/g$, from 150 to 850 $m^2/g$, or from 400 to 700 $m^2/g$, where the specific surface area is calculated through the Brunauer-Emmett-Teller (BET) theory.

The carbon nanotubes may have a metal oxide percentage of 10 weight percent (wt. %) or less, 5 wt. % or less, 3 wt. % or less, 2 wt. % or less, 1.5 wt. % or less, 1 wt. % or less, or 0.5 wt. % or less; and a bulk density of from 0.001 to 0.12 $g/cm^3$, from 0.01 to 0.08 $g/cm^3$, from 0.02 to 0.06 $g/cm^3$, from 0.01 to 1 grams per cubic centimeter ($g/cm^3$), from 0.01 to 0.5 $g/cm^3$, from 0.01 to 0.2 $g/cm^3$, from 0.01 to 0.1 $g/cm^3$, from 0.01 to 0.05 $g/cm^3$, from 0.01 to 0.02 $g/cm^3$, from 0.02 to 1 $g/cm^3$, from 0.02 to 0.5 $g/cm^3$, from 0.02 to 0.2 $g/cm^3$, from 0.02 to 0.1 $g/cm^3$, from 0.02 to 0.05 $g/cm^3$, from 0.05 to 1 $g/cm^3$, from 0.05 to 0.5 $g/cm^3$, from 0.05 to 0.2 $g/cm^3$, from 0.05 to 0.1 $g/cm^3$, from 0.06 to 0.08 $g/cm^3$, from 0.1 to 1 $g/cm^3$, 0.1 to 0.5 $g/cm^3$, from 0.1 to 0.2 $g/cm^3$, from 0.2 to 1 $g/cm^3$, from 0.2 to 0.5 $g/cm^3$, or from 0.5 to 1 $g/cm^3$.

As stated previously, the drilling fluid further includes at least one weighting agent. The weighting agent may be chosen from the group consisting of manganese oxide ($Mn_3O_4$), ferrosilicon, hausmannite, lime (CaO), calcium carbonate ($CaCO_3$), bentonite, montmorillonite clay, siderite ($FeCO_3$), ilmenite ($FeO.TiO_3$), barium sulfate (barite, ($BaSO_4$)), hematite ($Fe_2O_3$), mullite ($3Al_2O_3.2SiO_2$ or $2Al_2O_3.SiO_2$), kaolin ($Al_2Si_2O_5(OH)_4$ or kaolinite), alumina ($Al_2O_3$, or aluminum oxide), silicon carbide, tungsten carbide, and combinations of these.

In some embodiments, the drilling fluid may contain from 0.01 wt. % to 20 wt. % of the at least one weighting agent based on the total weight of the drilling fluid. The drilling fluid may contain from 0.02 pounds per barrel (lb/bbl) to 180 lb/bbl of the one or more additives based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the one or more additives.

In some embodiments, the at least one weighting agent may include solids, which may be dispersed in the drilling fluid. The solids may be finely divided solids that may be added to the drilling fluid to increase the density of the drilling fluid. The solids may have a specific gravity of from 1 to 10 grams per centimeter cubed ($g/cm^3$), from 2 to 10 $g/cm^3$, from 3 to 10 $g/cm^3$, from 4 to 10 $g/cm^3$, from 4.5 to 10 $g/cm^3$, from 5 to 10 $g/cm^3$, from 6 to 10 $g/cm^3$, from 8 to 10 $g/cm^3$, from 1 to 8 $g/cm^3$, from 2 to 8 $g/cm^3$, from 3 to 8 $g/cm^3$, from 4 to 8 $g/cm^3$, from 4.5 to 8 $g/cm^3$, from 5 to 8 $g/cm^3$, from 6 to 8 $g/cm^3$, from 1 to 6 $g/cm^3$, from 2 to 6 $g/cm^3$, from 3 to 6 $g/cm^3$, from 4 to 6 $g/cm^3$, from 4.5 to 6 $g/cm^3$, from 5 to 6 $g/cm^3$, from 1 to 5 $g/cm^3$, from 2 to 5 $g/cm^3$, from 3 to 5 $g/cm^3$, from 4 to 5 $g/cm^3$, from 4.5 to 5 $g/cm^3$, from 1 to 4.5 $g/cm^3$, from 2 to 4.5 $g/cm^3$, from 3 to 4.5 $g/cm^3$, from 4 to 4.5 $g/cm^3$, from 1 to 4 $g/cm^3$, from 2 to 4 $g/cm^3$, from 3 to 4 $g/cm^3$, from 1 to 3 $g/cm^3$, or from 2 to 3 $g/cm^3$.

In embodiments, the drilling fluid may have a solids content of from 1 wt. % to 80 wt. % based on the weight of the solid weighing material based on the total weight of the drilling fluid. The drilling fluid may have a solids content of from 2.5 lb/bbl to 720 lb/bbl, such as from 2.5 to 720 lb/bbl, or 2.5 to 700 lb/bbl. In some embodiments, the drilling fluid may have a solids content of from 5 to 700 lb/bbl, from 50 to 500 lb/bbl, or from 100 to 600 lb/bbl.

As stated, the addition of solids may be used to control the density of the drilling fluid. In some embodiments, the drilling fluid may have a density of from 50 pounds of mass per cubic foot (pcf) to 160 pcf, as measured using a mud balance in accordance with the American Petroleum Institute (API) recommended practice 13B-2, 2014. The drilling fluid may have a density of from 50 pcf to 150 pcf, from 50 pcf to 140 pcf, from 75 pcf to 160 pcf, from 75 pcf to 150 pcf, from 75 pcf to 140 pcf, from 100 pcf to 160 pcf, from 100 pcf to 150 pcf, or from 100 pcf to 140 pcf. In some embodiments, the drilling fluid may have a density of from 50 pcf to 75 pcf, or from 75 pcf to 100 pcf, or from 120 pcf to 160 pcf. In some embodiments, mud weights less than 100 pcf may be used when drilling depleted formations.

The drilling fluids of the present disclosure may overcome these difficulties by providing improved rheology characteristics, such as increased Newtonian viscosity, yield point, plastic viscosity, or density, and decreased thermal thinning of the drilling fluid with the dispersed nanoparticles versus a similar or equivalent drilling fluid without the nanoparticle dispersion.

The drilling fluid may include an aqueous phase. The aqueous phase may include at least one of fresh water, salt water, brine, municipal water, formation water, produced water, well water, filtered water, distilled water, sea water, or combinations of these. The brine may include at least one of natural and synthetic brine, such as saturated brine or formate brine. The aqueous phase may use water containing organic compounds or salt. Without being bound by any particular theory, salt or other organic compounds may be incorporated into the aqueous phase to control the density of the drilling fluid. Increasing the saturation of the aqueous phase by increasing the salt concentration or the level of other organic compounds in the aqueous phase may increase the density of the drilling fluid. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. In some particular embodiments, brine may be used in the aqueous phase. Without being bound by any particular theory, brine may be used to create osmotic balance between the drilling fluid and the subterranean formation.

In some embodiments, the drilling fluid may contain from 10 weight percent (wt. %) to 70 wt. % of the aqueous phase based on the total weight of the drilling fluid. In some embodiments, the drilling fluid may contain from 28 pounds per barrel (lb/bbl) to 630 lbs/bbl, such as from 30 to 600 lbs/bbl, from 50 to 500 lbs/bbl, from 100 to 500 lb/bbl, 200 to 500 lbs/bbl, or 300 to 600 lbs/bbl of the aqueous phase.

The drilling fluid may be non-aqueous. In some embodiments, the drilling fluid may include an oleaginous phase, which may include natural or synthetic liquid oil. Specifically, the drilling fluid may include diesel oil, mineral oil, hydrogenated or unhydrogenated olefins such as poly-alpha olefins, linear and branched olefins, poly-diorganosiloxanes, siloxanes, organosiloxanes, esters of fatty acids, straight chain, branched or cyclical alkyl ethers of fatty acids, esters, ethers, acetals, dialkylcarbonates, hydrocarbons or combinations of any of these. In some embodiments, the drilling fluid may include oils derived from petroleum, such as mineral oils, diesel oils, linear olefins, paraffin, and combinations of these oils or oils derived from plants, such as safra oil.

The drilling fluid may contain from 10 wt. % to 90 wt. % of the oleaginous phase based on the total weight of the drilling fluid. The drilling fluid may contain from 28 lb/bbl to 810 lb/bbl of the oleaginous phase based on the total weight of the drilling fluid, such as from 30 to 800 lb/bbl, from 50 to 800 lb/bbl, from 75 to 800 lb/bbl, or from 100 to 800 lb/bbl. In some embodiments, the drilling fluid may contain from 200 to 800 lb/bbl, or 300 to 600 lb/bbl, or 500 to 810 lb/bbl of the oleaginous phase.

The drilling fluid may include a polar aprotic solvent. In some embodiments, the polar aprotic solvent may replace the aqueous phase of the drilling fluid. A polar aprotic solvent polar lacks an acidic hydrogen, and therefore is not a hydrogen bond donor, meaning that it cannot donate a hydrogen. Polar aprotic solvents may dissolve salts and may be capable of accepting hydrogen bonds. Polar aprotic solvents may have a dielectric constant, or relative permittivity, of greater than 10, 15, 20, 25, 30, 35, or 40. Polar aprotic solvents may have a dielectric constant, or relative permittivity, of less than 15, 20, 25, 30, 35, 40, 50, 60, or 70. Polar aprotic solvents may also have a dipole moment of greater than 1 debye (1 debye=$1\times10^{-18}$ statcoulomb-centimeter), 2 debyes, 3 debyes, 3.5 debyes, 4 debyes, 4.5 debyes, or 5 debyes. Polar aprotic solvents may have a dipole moment of less 2 debyes, 3 debyes, 3.5 debyes, 4 debyes, 4.5 debyes, 5 debyes, 6 debyes, 7 debyes, 8 debyes, 9 debyes, or 10 debyes. The polar aprotic solvent may include at least one of n-alkyl pyrrolidone, dimethylformamide, dimethylsulfonide, acetonitrile, dimethylformamide, hexamethylphosphoramide, or dimethyl sulfoxide.

The drilling fluid may include at least one surfactant. The surfactant may maintain the dispersion of the carbon nanotubes within the drilling fluid. The surfactant may be anionic, cationic, or neutral. Non-limiting examples of anionic surfactants include sulfonated polymers, sulfonated alkanes, polycarboxylated ethers, or combinations of these. Non-limiting examples of cationic surfactants include trimethylalkylammonium salts, alkylbenxylammonium salts, or combinations of these. Non-limiting examples of neutral surfactants include proteins, polyethylene glycol derivatives, oligosaccharides, cholesterol derivatives, or combinations of these. The surfactant may include at least one of sulfonated polymers, sulfonated alkanes, polycarboxylated ethers, trimethylalkylammonium salts, alkylbenzylammonium salts, proteins, polyethylene glycol derivatives, oligosaccharides, or cholesterol derivatives. The drilling fluid may contain from 0.01 wt. % to 20 wt. % of the surfactant based on the total weight of the drilling fluid. The drilling fluid may contain from 0.02 lb/bbl to 180 lb/bbl of the surfactant based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the surfactant.

In some embodiments, the drilling fluid may contain at least one additive other than the surfactant. The one or more additives may be any additives known to be suitable for drilling fluids. As non-limiting examples, suitable additives may include fluid loss control agents, lost circulation control agents, filtration control additives, antifoaming agents, emulsifiers, weighting agent, fluid loss additives, an alkali reserve, specialty additives, and combinations of these.

In some embodiments, the one or more additives may include an additional viscosifier, also referred to as a rheology modifier, which may be added to the drilling fluid to impart non-Newtonian fluid rheology to the drilling fluid to facilitate lifting and conveying rock cuttings to the surface of the wellbore. The viscosifier may include bentonite, polyacrylamide, polyanionic cellulose, or combinations of these. In some embodiments, the drilling fluid may include xanthan gum, a polysaccharide commonly referred to XC polymer. The XC polymer may be added to the water-based drilling fluid to produce a flat velocity profile of the water-based drilling fluid in annular flow, which may help to improve the efficiency of the drilling fluid in lifting and conveying rock cuttings to the surface.

In some embodiments, the drilling fluid may contain from 0.01 wt. % to 20 wt. % of the one or more additives based on the total weight of the drilling fluid. The drilling fluid may contain from 0.02 lb/bbl to 180 lb/bbl of the one or more additives based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the one or more additives.

Embodiments of the disclosure further relate to methods of suspending at least one weighting agent in a drilling fluid. The resulting drilling fluid may be in accordance with any of the embodiments previously described. The method may involve adding a quantity of nanoparticles to the drilling fluid which results in an amount of carbon nanotubes dispersed within the drilling fluid. The dispersion of the quantity of nanoparticles increases the value of at least one of a Newtonian viscosity, a yield point, a plastic viscosity, and a density of the drilling fluid with the dispersed nanoparticles versus a similar or equivalent drilling fluid without the nanoparticle dispersion. The method may further include adding at least one weighting agent which will become suspended in the drilling fluid. The weighting agent is chosen from the group consisting of barite, hematite, lime, calcium carbonate, bentonite, montmorillonite clay, siderite, ilmenite, hausmannite, ferrosilicon, manganese oxide, mullite, kaolinite, aluminum oxide, silicon carbide, tungsten carbide, and combinations of these. The drilling fluid, carbon nanotubes, and at least one weighting agent may be in accordance with any of the embodiments previously described.

Referring to FIG. 1, individual nanoparticles of the iron oxide catalyst nanoparticles 100 may include iron oxide 120 and a transition metal 110. The transition metal 110 may include iron (Fe), cobalt (Co), or nickel (Ni). In other embodiments, the transition metal 110 may include at least one of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, ununbium, or combinations of these.

The individual nanoparticles of the iron oxide catalyst nanoparticles 100 may include 10 wt. % or less transition metal 110 as calculated by a weight of the iron oxide 120. In other embodiments, the individual nanoparticles of the iron oxide catalyst nanoparticles 100 may include from 0 to 10 wt. %, from 1 to 10 wt. %, from 2 to 10 wt. %, from 3 to 10 wt. %, from 4 to 10 wt. %, from 5 to 10 wt. %, from 6 to 10 wt. %, from 7 to 10 wt. %, from 8 to 10 wt. %, from 9 to 10 wt. %, from 1 to 9 wt. %, from 2 to 9 wt. %, from 3 to 9 wt. %, from 4 to 9 wt. %, from 5 to 9 wt. %, from 6 to 9 wt. %, from 7 to 9 wt. %, from 8 to 9 wt. %, from 1 to 8 wt. %, from 2 to 8 wt. %, from 3 to 8 wt. %, from 4 to 8 wt. %, from 5 to 8 wt. %, from 6 to 8 wt. %, from 7 to 8 wt. %, from 1 to 7 wt. %, from 2 to 7 wt. %, from 3 to 7 wt. %, from 4 to 7 wt. %, from 5 to 7 wt. %, from 6 to 7 wt. %, from 1 to 6 wt. %, from 2 to 6 wt. %, from 3 to 6 wt. %, from 4 to 6 wt. %, from 5 to 6 wt. %, from 1 to 5 wt. %, from 2 to 5 wt. %, from 3 to 5 wt. %, from 4 to 5 wt. %, from 1 to 4 wt. %, from 2 to 4 wt. %, from 3 to 4 wt. %, from 1 to 3 wt. %, from 2 to 3 wt. %, from 1 to 2 wt. %, or from 0 to 1 wt. % transition metal 110 as calculated by a weight of the iron oxide 120.

The iron oxide 120 may be a conventional drilling fluid additive and may include iron(II) oxide (also known as ferrous oxide, FeO), iron(III) oxide (also known as ferric oxide or hematite, $Fe_2O_3$), iron(II,III) oxide ($Fe_3O_4$), or combinations of these. The iron oxide catalyst nanoparticle may further include lithium oxide, sodium oxide, potassium oxide, rubidium oxide, magnesium oxide (MgO), calcium oxide (CaO), beryllium oxide, strontium oxide, barium oxide, radium oxide, scandium oxide, yttrium oxide, titanium oxide, zirconium oxide, vanadium oxide, niobium oxide, chromium oxide, molybdenum oxide, manganese oxide, technetium oxide, ruthenium oxide, cobalt oxide, rhodium oxide, nickel oxide, palladium oxide, copper oxide, silver oxide, gold oxide, platinum oxide, zinc oxide, cadmium oxide, mercury oxide, aluminum oxide, gallium oxide, indium oxide, tin oxide, thallium oxide, lead oxide, boron oxide, silicon oxide, or combinations of these.

The transition metal 110 may be disposed on the iron oxide 120 of the iron oxide catalyst nanoparticles 100, as shown. Specifically, in some embodiments, the iron oxide catalyst nanoparticles 100 may further include at least one of Fe, Co, or Ni disposed on the iron oxides 120.

In some embodiments, the method includes synthesizing carbon nanotubes via chemical vapor deposition on iron oxide catalyst nanoparticles to form a quantity of nanoparticles. Individual nanoparticles of the iron oxide catalyst nanoparticles include a transition metal disposed on iron oxide. The method includes adding the quantity of nanoparticles to the drilling fluid. The drilling fluid includes at least one surfactant. Adding the quantity of nanoparticles to the drilling fluid results in the quantity of nanoparticles dispersed within the drilling fluid. The dispersion of nanoparticles increases the value of at least one of the Newtonian viscosity, the yield point, the plastic viscosity, and the density of the drilling fluid with the dispersed nanoparticles versus a similar or equivalent drilling fluid without the nanoparticle dispersion. The method may further include adding at least one weighting agent that will become suspended in the drilling fluid. The weighting agent is chosen from the group consisting of barite, hematite, lime, calcium carbonate, bentonite, montmorillonite clay, siderite, ilmenite, hausmannite, ferrosilicon, manganese oxide, mullite, kaolinite, aluminum oxide, silicon carbide, tungsten carbide, and combinations of these.

In one embodiment, synthesizing carbon nanotubes via chemical vapor deposition on iron oxide catalyst nanoparticles to form a quantity of nanoparticles may include mixing an aqueous solution including the transition metal with an aqueous suspension of the iron oxide to form a mixture. In some embodiments, the aqueous suspension may include from 5 to 50 wt. %, from 5 to 30 wt. %, from 5 to 25 wt. %, from 5 to 20 wt. %, from 5 to 15 wt. %, from 5 to 10 wt. %, from 10 to 50 wt. %, from 10 to 30 wt. %, from 10 to 25 wt. %, from 10 to 20 wt. %, from 10 to 15 wt. %, from 15 to 50 wt. %, from 15 to 30 wt. %, from 15 to 25 wt. %, from 15 to 20 wt. %, from 20 to 50 wt. %, from 20 to 30 wt. %, from 20 to 25 wt. %, from 25 to 50 wt. %, from 25 to 30 wt. %, from 30 to 50 wt. % iron oxide as calculated by a weight of the aqueous suspension. Synthesizing the carbon nanotubes may then include stirring the mixture, drying the mixture at room temperature, and then grinding the mixture into a powder to form the iron oxide catalyst nanoparticles.

In an alternate embodiment, synthesizing carbon nanotubes via chemical vapor deposition on iron oxide catalyst nanoparticles to form a quantity of nanoparticles may include mixing an aqueous solution including the transition metal with a powder including the iron oxide to form a mixture. Synthesizing the carbon nanotubes may then include stirring the mixture and calcining the mixture at from 100° C. to 500° C., from 200° C. to 500° C., from 300° C. to 500° C., from 200° C. to 400° C., or from 300° C. to 400° C. for from 5 to 15 hours, from 5 to 12 hours, from 5 to 10 hours, from 5 to 8 hours, from 8 to 15 hours, from 8 to 12 hours, from 8 to 10 hours, from 10 to 15 hours, from 10 to 12 hours, or from 12 to 15 hours. Synthesizing the carbon nanotubes may then include grinding the mixture into a powder to form the iron oxide catalyst nanoparticles.

Synthesizing the carbon nanotubes may further include heating the iron oxide catalyst nanoparticles to from 300° C. to 1400° C., from 300° C. to 1100° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1100° C., from 600° C. to 1400° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. In some embodiments, heating the carbon nanotubes may include placing the iron oxide catalyst nanoparticles into an oven or a reactor. In some embodiments, synthesizing the carbon nanotubes may include placing carbon precursors in the oven, which vaporize as the oven heats, to form a quantity of nanoparticles including carbon nanotubes and iron oxide catalyst nanoparticles. In other embodiments, synthesizing the carbon nanotubes may include flowing a gas mixture over the iron oxide catalyst nanoparticles to form a quantity of nanoparticles including carbon nanotubes and iron oxide catalyst nanoparticles. In some embodiments, the gas mixture may include argon, hydrogen, benzene, ethylene, propylene, butylene, methylnaphthalene, toluene, xylene, graphite, acetylene, ethanol, methane, carbon monoxide, carbon dioxide, hydrocarbon gases, any other gas containing carbon, and combinations of these. The term "hydrocarbon gas" refers to a compound consisting of hydrogen and carbon atoms in a gas phase at standard temperature and pressure. Non-limiting examples of hydrocarbon gas are paraffinic hydrocarbons and alkylaromatic hydrocarbons. The phrase "other gases that contain carbon" means that the gas is a gas other than a hydrocarbon gas, in which the gas comprises compounds that include carbon atoms. In one embodiment, the gas mixture may include argon, hydrogen, and ethylene.

In some embodiments, heating the iron oxide catalyst nanoparticles includes flowing a gas mixture over the iron oxide catalyst nanoparticles with a heating rate of from 1° C. per minute (° C./min.) to 20° C./min., from 3° C./min. to 10° C./min., from 5° C./min. to 10° C./min., from 5° C./min. to 7° C./min., or of 5° C./min. until the metal oxide catalyst nanoparticles are heated to from 300° C. to 1400° C., from 300° C. to 1100° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1100° C., from 600° C. to 1400° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. Heating the metal oxide catalyst nanoparticles may further include adding from 0 to 50 volume percent (vol. %), from 2 to 30 vol. %, from 2 to 20 vol. %, from 2 to 15 vol. %, from 2 to 10 vol. %, from 2 to 5 vol. %, from 5 to 30 vol. %, from 5 to 20 vol. %, from 5 to 15 vol. %, from 5 to 10 vol. %, from 10 to 30 vol. %, from 10 to 20 vol. %, from 10 to 15 vol. %, from 15 to 30 vol. %, from 15 to 20 vol. %, or from 20 to 30 vol. % carbon-based gas, as calculated by a volume of the gas mixture, to the gas mixture and flowing the gas mixture over the iron oxide catalyst nanoparticles to form a quantity of nanoparticles including carbon nanotubes and iron oxide catalyst nanoparticles. The carbon-based gas may include any gas that includes carbon, such as carbon dioxide or hydrocarbon gases. In some embodiments, the carbon-based gas may be ethylene. The gas mixture including argon, hydrogen, and ethylene may include from 20 to 50 vol. %, from 20 to 40 vol. %, from 20 to 35 vol. %, from 20 to 30 vol. %, from 30 to 50 vol. %, from 30 to 40 vol. %, from 30 to 35 vol. %, from 35 to 40 vol. %, from 35 to 50 vol. %, or from 40 to 50 vol. % hydrogen, as calculated by a volume of the gas mixture, and from 50 to 80 vol. %, from 50 to 70 vol. %, from 50 to 65 vol. %, from 50 to 60 vol. %, from 60 to 65 vol. %, from 60 to 70 vol. %, from 60 to 80 vol. %, from 65 to 80 vol. %, from 65 to 70 vol. %, or from 70 to 80 vol. % argon, as calculated by a volume of the gas mixture. Flowing the gas mixture may include flowing the gas mixture at a rate of from 400 to 1000 milliliter per minute (ml/min.), from 500 to 800 ml/min., from 600 to 800 ml/min., or at 700 ml/min.

When the gas mixture contacts the iron oxide catalyst nanoparticles, the gas may decompose into carbon that dissolves into the iron oxide catalyst nanoparticles. After reaching the carbon-solubility limit in the iron oxide catalyst nanoparticles, the carbon may precipitate on the surface of the iron oxide catalyst nanoparticle and crystallize in the form of a cylindrical network, forming a carbon nanotube. In some embodiments, the gas mixture may contact the transition metal and decompose into carbon that dissolves into the transition metal. After reaching the carbon-solubility limit in the transition metal, the carbon may precipitate on the surface of the transition metal and crystallize in the form of a cylindrical network, forming a carbon nanotube. As stated previously, the carbon nanotubes are supported by the iron oxide catalyst nanoparticles. The carbon nanotubes being supported by the iron oxide catalyst nanoparticles may include carbon nanotubes adsorbed onto a surface of the iron oxide catalyst nanoparticles. In some embodiments, the carbon nanotubes being supported by the iron oxide catalyst nanoparticles may include carbon nanotubes bonded to a surface of the iron oxide catalyst nanoparticles.

Figure 2:
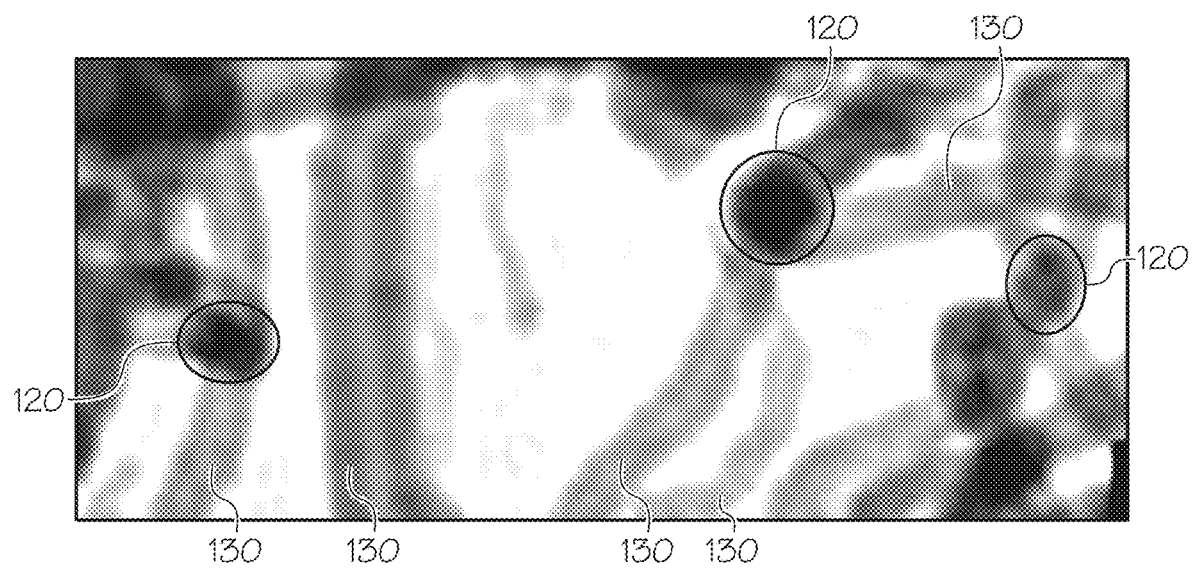
FIG. 2 photographically depicts carbon nanotubes adsorbed onto iron oxides, according to one or more embodiments described in this disclosure.

Synthesizing the carbon nanotubes via chemical vapor deposition on iron oxide catalyst nanoparticles may include diffusing carbon atoms through the carbon nanotubes. This is conventionally referred to as "tip growth." When the transition metal-iron oxide interaction is weak (when the transition metal has an acute contact angle with the iron oxide), carbon decomposes on the top surface of the transition metal and diffuses through the transition metal. This causes the carbon nanotube to precipitate between the transition metal and the iron oxide, to continue to grow between the transition metal and the iron oxide, and to push the transition metal off the iron oxide. Once the transition metal is fully covered with excess carbon, its catalytic activity ceases and the carbon nanotube ceases to grow. FIG. 2 photographically represents carbon nanotubes 130 grown via tip growth. The carbon nanotubes 130 are shown adsorbed onto the iron oxide 120.

In another embodiment, synthesizing carbon nanotubes via chemical vapor deposition on iron oxide catalyst nanoparticles includes diffusing carbon atoms along a surface of individual nanoparticles of the iron oxide catalyst nanoparticles. This is conventionally referred to as "base growth." When the transition metal-iron oxide interaction is strong (when the transition metal has an obtuse contact angle with the iron oxide), the initial carbon decomposition and diffusion takes place similarly to that in tip growth. However, as the carbon nanotube precipitates, the carbon nanotube precipitation fails to push the transition metal off the iron oxide. This forces the carbon nanotube to grow from the apex of the transition metal. The apex of the transition metal is the point on the transition metal farthest from the iron oxide. The carbon crystallizes initially as a hemispherical dome. Then, as the carbon continues to crystallize, it grows in the form of a cylinder, forming a carbon nanotube. Unlike in tip growth, where the carbon nanotube grows from the tip (or from the top down), the carbon nanotube grows from the base (or from the bottom up) in base growth. Base growth occurs when the transition metal continues to be disposed on the iron oxide. Subsequent hydrocarbon decomposition takes place on the peripheral surface of the transition metal and as-dissolved carbon diffuses upward.

In some embodiments, the method may further include synthesizing silicon carbide nanotubes supported by iron oxide catalyst nanoparticles. Synthesizing silicon carbide nanotubes may include exposing the carbon nanotubes supported by iron oxide catalyst nanoparticles to silicon vapor. This creates a quantity of silicon carbide nanoparticles including silicon carbide nanotubes supported by iron oxide catalyst nanoparticles.

Synthesizing silicon carbide nanotubes may further include heating the carbon nanotubes supported by iron oxide catalyst nanoparticles to from 300° C. to 1600° C., from 300° C. to 1400° C., from 300° C. to 1200° C., from 300° C. to 1000° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1000° C., from 600° C. to 1200° C., from 600° C. to 1400° C., from 600° C. to 1600° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. In some embodiments, heating the carbon nanotubes supported by iron oxide catalyst nanoparticles may include placing the carbon nanotubes supported by iron oxide catalyst nanoparticles into an oven or a reactor. In some embodiments, the reactor may be evacuated to an absolute pressure of from $1\times10^{-100}$ Torr to $1\times10^{-50}$ Torr, $1\times10^{-50}$ Torr to $1\times10^{-25}$ Torr, $1\times10^{-25}$ Torr to $1\times10^{-10}$ Torr, $1\times10^{-10}$ Torr to $1\times10^{-5}$ Torr, $1\times10^{-5}$ Torr to $1\times10^{-1}$ Torr, $1\times10^{-1}$ Torr to 0.5 Torr, 0.5 Torr to 1 Torr, 1 Torr to 10 Torr, 10 Torr to 20 Torr, 20 Torr to 40, 40 Torr to 50 Torr, 50 Torr to 100 Torr, 100 Torr to 150 Torr, 150 Torr to 300 Torr, 300 Torr to 450 Torr, 450 Torr to 600 Torr, 600 Torr to 750 Torr, or any combination of these.

In some embodiments, synthesizing the silicon carbide nanotubes supported by iron oxide catalyst nanoparticles may include placing silicon precursors in the oven. The silicon precursors vaporize as the oven heats and forms a quantity of silicon carbide nanoparticles. This quantity of silicon carbide precursor nanoparticles includes silicon carbide nanotubes and iron oxide catalyst nanoparticles. In other embodiments, synthesizing the silicon carbide nanotubes may include flowing a gas mixture over the carbon nanotubes to form the quantity of silicon carbide nanoparticles. In some embodiments, the gas mixture may include argon, hydrogen, silicon, methyltrichlorosilane, any other gas containing silicon, and combinations of these. Specifically, in one embodiment, the gas mixture may include argon, hydrogen, and methyltrichlorosilane.

In some embodiments, heating the carbon nanotubes supported by iron oxide catalyst nanoparticles includes flowing a gas mixture over the carbon nanotubes supported by iron oxide catalyst nanoparticles with a heating rate of from 1° C./min. to 20° C./min., from 3° C./min. to 10° C./min., from 5° C./min. to 10° C./min., from 5° C./min. to 7° C./min., or of 5° C./min. Heating the carbon nanotubes supported by iron oxide catalyst nanoparticles may further include adding from 0 to 50 volume percent (vol. %), from 2 to 30 vol. %, from 2 to 20 vol. %, from 2 to 15 vol. %, from 2 to 10 vol. %, from 2 to 5 vol. %, from 5 to 30 vol. %, from 5 to 20 vol. %, from 5 to 15 vol. %, from 5 to 10 vol. %, from 10 to 30 vol. %, from 10 to 20 vol. %, from 10 to 15 vol. %, from 15 to 30 vol. %, from 15 to 20 vol. %, or from 20 to 30 vol. % silicon-based gas (as calculated by a volume of the gas mixture) to the gas mixture. In some embodiments, the method may further include flowing the gas mixture over the carbon nanotubes supported by iron oxide catalyst nanoparticles to form the quantity of silicon carbide nanoparticles. The silicon-based gas may include any gas that includes silicon, such as methyltrichlorosilane, N-sec-butyl(trimethylsilyl)amine, chloropentamethyldisilane, hexamethyldisilane, pentamethyldisilane, silicon tetrabromide, triethylsilane, any other gas including silicon, or mixtures of these. The gas mixture including argon, hydrogen, and silicon may include from 20 to 50 vol. %, from 20 to 40 vol. %, from 20 to 35 vol. %, from 20 to 30 vol. %, from 30 to 50 vol. %, from 30 to 40 vol. %, from 30 to 35 vol. %, from 35 to 40 vol. %, from 35 to 50 vol. %, or from 40 to 50 vol. % hydrogen, as calculated by a volume of the gas mixture, and from 50 to 80 vol. %, from 50 to 70 vol. %, from 50 to 65 vol. %, from 50 to 60 vol. %, from 60 to 65 vol. %, from 60 to 70 vol. %, from 60 to 80 vol. %, from 65 to 80 vol. %, from 65 to 70 vol. %, or from 70 to 80 vol. % argon, as calculated by a volume of the gas mixture. Flowing the gas mixture may include flowing the gas mixture at a rate of from 10 to 1000 ml/min., from 50 to 800 ml/min., from 100 to 400 ml/min., or at 150 ml/min. According to some embodiments, the gas mixture may be prepared by flowing hydrogen gas through methyltricholorosilane, thereby generating the silicon-based gas.

The silicon carbide nanotubes supported by iron oxide catalyst nanoparticles may be annealed in air at an elevated temperature. As used in this disclosure, annealing refers to the process of heating a substrate under a specific atmosphere to an annealing temperature, holding the substrate at the annealing temperature for a period of time, and allowing the substrate to cool. An annealing temperature is a temperature less than the melting temperature of the substrate. For example, the silicon carbide nanotubes supported by iron oxide catalyst nanoparticles may be annealed at a temperature from 500° C. to 600° C., from 600° C. to 700° C., from 700° C. to 800° C., from 800° C. to 900° C., from 900° C. to 1000° C., from 1000° C. to 1100° C., from 1100° C. to 1200° C., from 1200° C. to 1300° C., from 1300° C. to 1400° C., from 1400° C. to 1500° C., from 1500° C. to 1600° C., from 1600° C. to 1700° C., from 1700° C. to 1800° C., or any combination of these. For example, the silicon carbide nanotubes supported by iron oxide catalyst nanoparticles may be held at the annealing temperature for from 0.001 minute (min) to 5 min, from 5 min to 10 min, from 10 min to 20 min, from 20 min to 30 min, from 30 min to 40 min, from 40 min to 50 min, from 50 min to 60 min, from 60 min to 70 min, or even greater than 70 min, or any combination of these. The annealing step may further include a cooling step in which the temperature of the silicon carbide nanotubes supported by iron oxide catalyst nanoparticles may be reduced by from 200° C./min. to 150° C./min., from 150° C./min. to 100° C./min., from 100° C./min. to 50° C./min., from 50° C./min. to 25° C./min., from 25° C./min. to 20° C./min., from 20° C./min. to 15° C./min., from 15° C./min. to 10° C./min., from 10° C./min. to 5° C./min., from 5° C./min. to 1° C./min., from 1° C./min. to 0.5° C./min., from 0.5° C./min. to 0.1° C./min., or even less than 0.1° C./min., or any combination of these. The annealing step may occur under a specific atmosphere where the specific atmosphere includes air, inert gas, a reducing gas, an oxidizing gas, or a combination of these.

As stated previously, the method includes adding the quantity of nanoparticles to the drilling fluid, and leaving the quantity of nanoparticles dispersed within the drilling fluid and increasing at least one of a Newtonian viscosity, a yield point, a plastic viscosity, and a density of the drilling fluid with the dispersed nanoparticles versus a similar or equivalent drilling fluid without the nanoparticle dispersion. Individual nanoparticles of the quantity of nanoparticles may include carbon nanotubes absorbed onto the iron oxide catalyst nanoparticles, which ensures that the carbon nanotubes are dispersed within the drilling fluid and not clumped together, as the iron oxide catalyst nanoparticles separate groupings of the carbon nanotubes. This results in dispersed carbon nanotubes throughout the drilling fluid and no clumps of carbon nanotubes as are formed with conventional methods. In some embodiments, the drilling fluid has a persistent dispersion homogeneity. The phrase "persistent dispersion homogeneity" means that a first concentration of the carbon nanotubes at any discrete point throughout the drilling fluid does not vary by more than 30% from a second concentration of the carbon nanotubes at any second discrete point throughout the drilling fluid. In other words, the concentration of the carbon nanotubes will not result in clumped carbon nanotubes at any point within the drilling fluid. In the embodiments described in this disclosure, the persistent dispersion homogeneity throughout the drilling fluid is such that, for a discrete point throughout the drilling fluid, the extrema (the minimum or maximum) of the concentration of carbon nanotubes is greater than or equal to about 70% and less than or equal to about 130% of the concentration of carbon nanotubes within the drilling fluid at any second discrete point of the drilling fluid.

As stated previously, the method includes adding at least one weighting agent after the addition of the quantity of nanoparticles, in which the carbon nanotubes in the drilling fluid aid in suspending the weighting agent, and in which the weighting agent is chosen from the group consisting of barite, hematite, lime, calcium carbonate, bentonite, montmorillonite clay, siderite, ilmenite, hausmannite, ferrosilicon, manganese oxide, mullite, kaolinite, aluminum oxide, silicon carbide, tungsten carbide, and combinations of these. Adding at least one weighting agent may increase the density of the drilling fluid by 0.1 $g/cm^3$. In some embodiments, adding at least one weighting agent may increase the density of the drilling fluid by from 0.05 to 10 $g/cm^3$, from 0.05 to 5 $g/cm^3$, from 0.05 to 3 $g/cm^3$, from 0.05 to 2 $g/cm^3$, from 0.05 to 1 $g/cm^3$, from 0.05 to 0.5 $g/cm^3$, from 0.05 to 0.1 $g/cm^3$, from 0.1 to 10 $g/cm^3$, from 0.1 to 5 $g/cm^3$, from 0.1 to 3 $g/cm^3$, from 0.1 to 2 $g/cm^3$, from 0.1 to 1 $g/cm^3$, from 0.1 to 0.5 $g/cm^3$, from 0.5 to 10 $g/cm^3$, from 0.5 to 5 $g/cm^3$, from 0.5 to 3 $g/cm^3$, from 0.5 to 2 $g/cm^3$, from 0.5 to 1 $g/cm^3$, from 1 to 10 $g/cm^3$, from 1 to 5 $g/cm^3$, from 1 to 3 $g/cm^3$, from 1 to 2 $g/cm^3$, from 2 to 10 $g/cm^3$, from 2 to 5 $g/cm^3$, from 2 to 3 $g/cm^3$, from 3 to 10 $g/cm^3$, from 3 to 5 $g/cm^3$, or from 5 to 10 $g/cm^3$.

In some embodiments, the method may further include functionalizing a surface of the carbon nanotubes before adding the quantity of nanoparticles including carbon nanotubes supported by iron oxide catalyst nanoparticles to the drilling fluid. In another embodiment, the method may further include functionalizing a surface of the carbon nanotubes after adding the quantity of nanoparticles including carbon nanotubes supported by iron oxide catalyst nanoparticles to the drilling fluid. In yet another embodiment, the method may further include functionalizing a surface of the carbon nanotubes after adding the quantity of nanoparticles to the drilling fluid. In some embodiments, functionalizing the surface of the carbon nanotubes may include functionalizing the surface of the carbon nanotubes with hydrophilic functional groups. The hydrophilic functional groups may include hydroxyl groups, carbonyl groups, carboxyl groups, amino groups, sulfhydryl groups, phosphate groups, and combinations of these. Specifically, the method may further include functionalizing a surface of the carbon nanotubes with at least one of carboxylates, ammonium derivatives, sulfonated monomers, oligomers, or polymers.

The nanoparticle dispersion may increase the Newtonian viscosity of the drilling fluid with the dispersed nanoparticles versus a similar or equivalent drilling fluid without the nanoparticle dispersion by 500 centiPoise (cP). In some embodiments, the nanoparticle dispersion may increase the Newtonian viscosity of the drilling fluid with the dispersed nanoparticles versus a similar or equivalent drilling fluid without the nanoparticle dispersion by from 5 to 2000 cP, from 5 to 1000 cP, from 5 to 700 cP, from 5 to 600 cP, from 5 to 500 cP, from 5 to 400 cP, from 5 to 200 cP, from 5 to 100 cP, from 5 to 50 cP, from 50 to 2000 cP, from 50 to 1000 cP, from 50 to 700 cP, from 50 to 600 cP, from 50 to 500 cP, from 50 to 400 cP, from 50 to 200 cP, from 50 to 100 cP, from 100 to 2000 cP, from 100 to 1000 cP, from 100 to 700 cP, from 100 to 600 cP, from 100 to 500 cP, from 100 to 400 cP, from 100 to 200 cP, from 200 to 2000 cP, from 200 to 1000 cP, from 200 to 700 cP, from 200 to 600 cP, from 200 to 500 cP, from 200 to 400 cP, from 400 to 2000 cP, from 400 to 1000 cP, from 400 to 700 cP, from 400 to 600 cP, from 400 to 500 cP, from 500 to 2000 cP, from 500 to 1000 cP, from 500 to 700 cP, from 500 to 600 cP, from 600 to 2000 cP, from 600 to 1000 cP, from 600 to 700 cP, from 700 to 2000 cP, from 700 to 1000 cP, or from 1000 to 2000 cP. In some embodiments, the nanoparticle dispersion may increase the Newtonian viscosity of the drilling fluid with the dispersed nanoparticles versus a similar or equivalent drilling fluid without the nanoparticle dispersion by 10%, 20%, 30%, 40%, 50%, 60%, 70%, 80%, 90%, 100%, 125%, 150%, 200%, 250%, 300%, or 500%.

The method may further include adding the additives previously described into the drilling fluid. Adding the additives may involve mixing the additives into the drilling fluid. In some embodiments, the drilling fluid may be mixed at a shear speed of from 4000 rotations per minute (RPM) to 16000 RPM. The drilling fluid may be mixed at a shear speed of from 4000 RPM to 15000 RPM, or from 5000 RPM to 15000 RPM, or from 5000 RPM to 1000 RPM, or from 8000 RPM to 16000 RPM, or from 10000 RPM to 16000 RPM, or from 12000 RPM to 16000 RPM.

Embodiments of the disclosure may also relate to methods for using the drilling fluid. The drilling fluid may be in accordance with any of the embodiments previously described. In some embodiments, the drilling fluid may be introduced into a subterranean formation. Introducing may involve injecting the drilling fluid into the subterranean formation, which, in some embodiments, may be a well. The drilling fluid may be circulated within the subterranean formation. In some embodiments, a mud pump may be used to inject the drilling fluid into the subterranean formation.

In some specific embodiments the disclosure relates to methods of using the drilling fluid for oil and gas drilling. The methods may include pumping the drilling fluid through a drill string to a drill bit and recirculating the drilling fluid. Recirculating the fluid may allow the drilling fluid to cool and lubricate the drill bit and to lift rock cuttings away from the drill bit, carrying the cuttings upwards to the surface to clean the wellbore. The drilling fluid may additionally provide hydrostatic pressure to support the sidewalls of the wellbore and prevent the sidewalls from collapsing onto the drill string.

As previously described, fluid rheology is an important parameter of drilling fluid performance. For critical offshore applications with extreme temperature and pressure requirements (such as temperatures greater than 200° C. and pressures greater than 1,000 pounds per square inch (psi)), the viscosity profile of the fluid often is measured with a controlled temperature and pressure rotational viscometer (for instance, an iX77 rheometer, commercially available from Fann Instruments (Houston, Tex.)). Fluids may be tested at temperatures of from 35° F. to 500° F., with pressures of up to 20,000 psi. Cold-fluid rheology may be important because of the temperatures less than 32° F. that the fluid is exposed to in deepwater risers. Temperatures greater than 100° F. may be encountered in deep wells or in geothermally heated wells. The fluid may be under pressures greater than 2,000 psi downhole, and its viscosity profile may change accordingly. The rheological behavior of the drilling fluid, such as gel strength, plastic viscosity, and yield point, may be determined from measurements of the Newtonian viscosity, shear stress, and shear rate.

The gel strength of a drilling fluid refers to the shear stress of the drilling fluid measured at a shear rate less than 10 RPM following a defined period of time during which the drilling fluid is maintained in a static state. The drilling fluids of the present disclosure may have a gel strength after 10 seconds of from 0.5 to 30 pounds force per 100 cubic feet (lb$_f$/100 ft$^2$). In some embodiments, the drilling fluid may have a gel strength after 10 seconds of from 0.5 to 100 lb$_f$/100 ft$^2$, from 0.5 to 60 lb$_f$/100 ft$^2$, from 0.5 to 50 lb$_f$/100 ft$^2$, from 0.5 to 40 lb$_f$/100 ft$^2$, from 0.5 to 30 lb$_f$/100 ft$^2$, from 0.5 to 20 lb$_f$/100 ft$^2$, from 0.5 to 15 lb$_f$/100 ft$^2$, from 0.5 to 10 lb$_f$/100 ft$^2$, from 0.5 to 5 lb$_f$/100 ft$^2$, from 0.5 to 1 lb$_f$/100 ft$^2$, from 1 to 100 lb$_f$/100 ft$^2$, from 1 to 60 lb$_f$/100 ft$^2$, from 1 to 50 lb$_f$/100 ft$^2$, from 1 to 40 lb$_f$/100 ft$^2$, from 1 to 30 lb$_f$/100 ft$^2$, from 1 to 20 lb$_f$/100 ft$^2$, from 1 to 15 lb$_f$/100 ft$^2$, from 1 to 10 lb$_f$/100 ft$^2$, from 1 to 5 lb$_f$/100 ft$^2$, from 5 to 100 lb$_f$/100 ft$^2$, from 5 to 60 lb$_f$/100 ft$^2$, from 5 to 50 lb$_f$/100 ft$^2$, from 5 to 40 lb$_f$/100 ft$^2$, from 5 to 30 lb$_f$/100 ft$^2$, from 5 to 20 lb$_f$/100 ft$^2$, from 5 to 15 lb$_f$/100 ft$^2$, from 5 to 10 lb$_f$/100 ft$^2$, from 10 to 100 lb$_f$/100 ft$^2$, from 10 to 60 lb$_f$/100 ft$^2$, from 10 to 50 lb$_f$/100 ft$^2$, from 10 to 40 lb$_f$/100 ft$^2$, from 10 to 30 lb$_f$/100 ft$^2$, from 10 to 20 lb$_f$/100 ft$^2$, from 10 to 15 lb$_f$/100 ft$^2$, from 15 to 100 lb$_f$/100 ft$^2$, from 15 to 60 lb$_f$/100 ft$^2$, from 15 to 50 lb$_f$/100 ft$^2$, from 15 to 40 lb$_f$/100 ft$^2$, from 15 to 30 lb$_f$/100 ft$^2$, from 15 to 20 lb$_f$/100 ft$^2$, from 20 to 100 lb$_f$/100 ft$^2$, from 20 to 60 lb$_f$/100 ft$^2$, from 20 to 50 lb$_f$/100 ft$^2$, from 20 to 40 lb$_f$/100 ft$^2$, from 20 to 30 lb$_f$/100 ft$^2$, from 30 to 100 lb$_f$/100 ft$^2$, from 30 to 60 lb$_f$/100 ft$^2$, from 30 to 50 lb$_f$/100 ft$^2$, from 30 to 40 lb$_f$/100 ft$^2$, from 40 to 100 lb$_f$/100 ft$^2$, from 40 to 60 lb$_f$/100 ft$^2$, from 40 to 50 lb$_f$/100 ft$^2$, from 50 to 100 lb$_f$/100 ft$^2$, from 50 to 60 lb$_f$/100 ft$^2$, or from 60 to 100 lb$_f$/100 ft$^2$. In some embodiments, the nanoparticle dispersion may increase the 10-second gel strength of the drilling fluid with the dispersed nanoparticles versus a similar or equivalent drilling fluid without the nanoparticle dispersion by 10%, 20%, 30%, 40%, 50%, 60%, 70%, 80%, 90%, 100%, 125%, 150%, 200%, 250%, 300%, or 500%.

Similarly, the drilling fluids of the present disclosure may have a gel strength after 10 minutes of from 0.5 to 50 lb$_f$/100 ft$^2$. In some embodiments, the drilling fluid may have a gel strength after 10 seconds of from 0.5 to 100 lb$_f$/100 ft$^2$, from 0.5 to 60 lb$_f$/100 ft$^2$, from 0.5 to 50 lb$_f$/100 ft$^2$, from 0.5 to 40 lb$_f$/100 ft$^2$, from 0.5 to 30 lb$_f$/100 ft$^2$, from 0.5 to 20 lb$_f$/100 ft$^2$, from 0.5 to 15 lb$_f$/100 ft$^2$, from 0.5 to 10 lb$_f$/100 ft$^2$, from 0.5 to 5 lb$_f$/100 ft$^2$, from 0.5 to 1 lb$_f$/100 ft$^2$, from 1 to 100 lb$_f$/100 ft$^2$, from 1 to 60 lb$_f$/100 ft$^2$, from 1 to 50 lb$_f$/100 ft$^2$, from 1 to 40 lb$_f$/100 ft$^2$, from 1 to 30 lb$_f$/100 ft$^2$, from 1 to 20 lb$_f$/100 ft$^2$, from 1 to 15 lb$_f$/100 ft$^2$, from 1 to 10 lb$_f$/100 ft$^2$, from 1 to 5 lb$_f$/100 ft$^2$, from 5 to 100 lb$_f$/100 ft$^2$, from 5 to 60 lb$_f$/100 ft$^2$, from 5 to 50 lb$_f$/100 ft$^2$, from 5 to 40 lb$_f$/100 ft$^2$, from 5 to 30 lb$_f$/100 ft$^2$, from 5 to 20 lb$_f$/100 ft$^2$, from 5 to 15 lb$_f$/100 ft$^2$, from 5 to 10 lb$_f$/100 ft$^2$, from 10 to 100 lb$_f$/100 ft$^2$, from 10 to 60 lb$_f$/100 ft$^2$, from 10 to 50 lb$_f$/100 ft$^2$, from 10 to 40 lb$_f$/100 ft$^2$, from 10 to 30 lb$_f$/100 ft$^2$, from 10 to 20 lb$_f$/100 ft$^2$, from 10 to 15 lb$_f$/100 ft$^2$, from 15 to 100 lb$_f$/100 ft$^2$, from 15 to 60 lb$_f$/100 ft$^2$, from 15 to 50 lb$_f$/100 ft$^2$, from 15 to 40 lb$_f$/100 ft$^2$, from 15 to 30 lb$_f$/100 ft$^2$, from 15 to 20 lb$_f$/100 ft$^2$, from 20 to 100 lb$_f$/100 ft$^2$, from 20 to 60 lb$_f$/100 ft$^2$, from 20 to 50 lb$_f$/100 ft$^2$, from 20 to 40 lb$_f$/100 ft$^2$, from 20 to 30 lb$_f$/100 ft$^2$, from 30 to 100 lb$_f$/100 ft$^2$, from 30 to 60 lb$_f$/100 ft$^2$, from 30 to 50 lb$_f$/100 ft$^2$, from 30 to 40 lb$_f$/100 ft$^2$, from 40 to 100 lb$_f$/100 ft$^2$, from 40 to 60 lb$_f$/100 ft$^2$, from 40 to 50 lb$_f$/100 ft$^2$, from 50 to 100 lb$_f$/100 ft$^2$, from 50 to 60 lb$_f$/100 ft$^2$, or from 60 to 100 lb$_f$/100 ft$^2$. In some embodiments, the nanoparticle dispersion may increase the 10-minute gel strength of the drilling fluid with the dispersed nanoparticles versus a similar or equivalent drilling fluid without the nanoparticle dispersion by 10%, 20%, 30%, 40%, 50%, 60%, 70%, 80%, 90%, 100%, 125%, 150%, 200%, 250%, 300%, or 500%.

The rheological behavior of the drilling fluid may be determined by measuring the shear stress on the drilling fluid at different shear rates, which may be accomplished by measuring the shear stress or shear rate on the drilling fluid. The various shear rates are utilized as drilling fluid behaves as a rigid body at lesser shear stresses but flows as a viscous fluid at greater shear stresses. The rheology of the drilling fluid may be characterized by the plastic viscosity (PV) in centiPoise (cP) and the yield point (YP), which are parameters from the Bingham plastic rheology model. The PV is related to the resistance of the drilling fluid to flow due to mechanical interaction between the solids of the drilling fluid and represents the viscosity of the drilling fluid extrapolated to infinite shear rate. The PV reflects the type and concentration of the solids in the drilling fluid. The PV of a drilling fluid may be estimated by measuring the shear stress of the drilling fluid using the previously described rheometer at spindle speeds of 300 rotations per minute (RPM) and 600 RPM and subtracting the 300 RPM dial reading from the 600 RPM dial reading according to Equation 1:

$$PV(cP) = \text{(dial reading at 600 RPM)} - \text{(dial reading at 300 RPM)} \qquad \text{Equation 1}$$

The drilling fluids of the present disclosure may have a PV of from 5 to 2000 cP. In some embodiments, the drilling fluid may have a PV of from 5 to 5000 cP, from 5 to 1500 cP, from 5 to 1000 cP, from 5 to 500 cP, from 5 to 100 cP, from 5 to 50 cP, from 50 to 5000 cP, from 50 to 2000 cP, from 50 to 1500 cP, from 50 to 1000 cP, from 50 to 500 cP, from 50 to 100 cP, from 100 to 5000 cP, from 100 to 2000 cP, from 100 to 1500 cP, from 100 to 1000 cP, from 100 to 500 cP, from 500 to 5000 cP, from 500 to 2000 cP, from 500 to 1500 cP, from 500 to 1000 cP, from 1000 to 5000 cP, from 1000 to 2000 cP, from 1000 to 1500 cP, from 1500 to 5000 cP, from 1500 to 2000 cP, or from 2000 to 5000 cP. In some embodiments, the nanoparticle dispersion may increase the PV of the drilling fluid with the dispersed nanoparticles versus a similar or equivalent drilling fluid without the nanoparticle dispersion by 10%, 20%, 30%, 40%, 50%, 60%, 70%, 80%, 90%, 100%, 125%, 150%, 200%, 250%, 300%, or 500%.

The hydraulic fracturing fluid behaves as a rigid body when the shear stress is less than the YP, and the hydraulic fracturing fluid flows as a viscous fluid when the shear stress is greater than the YP. In other words, the YP represents the amount of stress required to move the drilling fluid from a static condition. The YP is expressed as a force per area, such as pounds of force per one hundred square feet ($lb_f/100$ $ft^2$). YP provides an indication of the solids carrying capacity of the drilling fluid through the annulus, which in simplified terms gives an indication of the drilling fluid's hole-cleaning ability. A drilling fluid having a YP of equal to or greater than 15 $lb_f/100$ $ft^2$ is considered acceptable for drilling. The YP is determined by extrapolating the Bingham plastic rheology model to a shear rate of zero. The YP may be estimated from the PV (as measured in accordance with Equation 1, as previously described) according to Equation 2:

$$YP = (\text{dial reading at 300 RPM}) - PV \quad \text{Equation 2}$$

The drilling fluids of the present disclosure may have a YP of from 0.5 to 50 $lb_f/100$ $ft^2$. In some embodiments, the drilling fluids of the present disclosure may have a YP of from 0.5 to 100 $lb_f/100$ $ft^2$, from 0.5 to 60 $lb_f/100$ $ft^2$, from 0.5 to 40 $lb_f/100$ $ft^2$, from 0.5 to 30 $lb_f/100$ $ft^2$, from 0.5 to 20 $lb_f/100$ $ft^2$, from 0.5 to 15 $lb_f/100$ $ft^2$, from 0.5 to 10 $lb_f/100$ $ft^2$, from 0.5 to 5 $lb_f/100$ $ft^2$, from 0.5 to 1 $lb_f/100$ $ft^2$, from 1 to 100 $lb_f/100$ $ft^2$, from 1 to 60 $lb_f/100$ $ft^2$, from 1 to 50 $lb_f/100$ $ft^2$, from 1 to 40 $lb_f/100$ $ft^2$, from 1 to 30 $lb_f/100$ $ft^2$, from 1 to 20 $lb_f/100$ $ft^2$, from 1 to 15 $lb_f/100$ $ft^2$, from 1 to 10 $lb_f/100$ $ft^2$, from 1 to 5 $lb_f/100$ $ft^2$, from 5 to 100 $lb_f/100$ $ft^2$, from 5 to 60 $lb_f/100$ $ft^2$, from 5 to 50 $lb_f/100$ $ft^2$, from 5 to 40 $lb_f/100$ $ft^2$, from 5 to 30 $lb_f/100$ $ft^2$, from 5 to 20 $lb_f/100$ $ft^2$, from 5 to 15 $lb_f/100$ $ft^2$, from 5 to 10 $lb_f/100$ $ft^2$, from 10 to 100 $lb_f/100$ $ft^2$, from 10 to 60 $lb_f/100$ $ft^2$, from 10 to 50 $lb_f/100$ $ft^2$, from 10 to 40 $lb_f/100$ $ft^2$, from 10 to 30 $lb_f/100$ $ft^2$, from 10 to 20 $lb_f/100$ $ft^2$, from 10 to 15 $lb_f/100$ $ft^2$, from 15 to 100 $lb_f/100$ $ft^2$, from 15 to 60 $lb_f/100$ $ft^2$, from 15 to 50 $lb_f/100$ $ft^2$, from 15 to 40 $lb_f/100$ $ft^2$, from 15 to 30 $lb_f/100$ $ft^2$, from 15 to 20 $lb_f/100$ $ft^2$, from 20 to 100 $lb_f/100$ $ft^2$, from 20 to 60 $lb_f/100$ $ft^2$, from 20 to 50 $lb_f/100$ $ft^2$, from 20 to 40 $lb_f/100$ $ft^2$, from 20 to 30 $lb_f/100$ $ft^2$, from 30 to 100 $lb_f/100$ $ft^2$, from 30 to 60 $lb_f/100$ $ft^2$, from 30 to 50 $lb_f/100$ $ft^2$, from 30 to 40 $lb_f/100$ $ft^2$, from 40 to 100 $lb_f/100$ $ft^2$, from 40 to 60 $lb_f/100$ $ft^2$, from 40 to 50 $lb_f/100$ $ft^2$, from 50 to 100 $lb_f/100$ $ft^2$, from 50 to 60 $lb_f/100$ $ft^2$, or from 60 to 100 $lb_f/100$ $ft^2$. In some embodiments, the nanoparticle dispersion may increase the YP of the drilling fluid with the dispersed nanoparticles versus a similar or equivalent drilling fluid without the nanoparticle dispersion by 10%, 20%, 30%, 40%, 50%, 60%, 70%, 80%, 90%, 100%, 125%, 150%, 200%, 250%, 300%, or 500%.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

The presently described subject matter may include one or more aspects, which should not be regarded as limiting on the teachings of the present disclosure. A first aspect may include a method of suspending at least one weighting agent in a drilling fluid comprising: synthesizing carbon nanotubes via chemical vapor deposition on iron oxide catalyst nanoparticles to form a quantity of nanoparticles, in which individual nanoparticles of the iron oxide catalyst nanoparticles comprise a transition metal disposed on iron oxide; adding the quantity of nanoparticles to the drilling fluid, forming dispersed nanoparticles; and adding at least one weighting agent to the drilling fluid after the addition of the quantity of nanoparticles, in which: at least one of a Newtonian viscosity, a yield point, a plastic viscosity, and a density value of the drilling fluid is greater with the presence of the dispersed nanoparticles compared to an equivalent drilling fluid without the dispersed nanoparticles, an amount of suspended weighting agent in the drilling fluid is increased with the presence of the dispersed nanoparticles compared to an equivalent drilling fluid without the dispersed nanoparticles, and the weighting agent is chosen from the group consisting of barite, hematite, lime, calcium carbonate, bentonite, montmorillonite clay, siderite, ilmenite, hausmannite, ferrosilicon, manganese oxide, mullite, kaolinite, aluminum oxide, silicon carbide, tungsten carbide, and combinations of these.

A second aspect may include a drilling fluid substantially as described in this disclosure, or including one or more of the features described in this disclosure.

Another aspect includes any of the previous aspects, in which the transition metal comprises Fe, Co, or Ni.

Another aspect includes any of the previous aspects, in which the iron oxide comprises iron(II) oxide, iron(III) oxide, iron(II,III) oxide, or combinations of these.

Another aspect includes any of the previous aspects, in which the carbon nanotubes are adsorbed onto the iron oxide catalyst nanoparticles.

Another aspect includes any of the previous aspects, in which individual nanoparticles of the iron oxide catalyst nanoparticles comprise 10 wt. % or less transition metal as calculated by a weight of the iron oxide.

Another aspect includes any of the previous aspects, further comprising functionalizing a surface of the carbon nanotubes with at least one of carboxylates, ammonium derivatives, sulfonated monomers, oligomers, or polymers, after adding the quantity of nanoparticles to the drilling fluid.

Another aspect includes any of the previous aspects, in which synthesizing carbon nanotubes via chemical vapor deposition on iron oxide catalyst nanoparticles comprises diffusing carbon atoms through the carbon nanotubes.

Another aspect includes any of the previous aspects, in which synthesizing carbon nanotubes via chemical vapor deposition on iron oxide catalyst nanoparticles comprises diffusing carbon atoms along a surface of individual nanoparticles of the iron oxide catalyst nanoparticles.

Another aspect includes any of the previous aspects, in which the drilling fluid comprises a polar aprotic solvent.

Another aspect includes any of the previous aspects, in which the polar aprotic solvent comprises at least one of n-alkyl pyrrolidone, dimethylformamide, or dimethylsulfoxide.

Another aspect includes any of the previous aspects, in which the drilling fluid comprises one or more additives selected from the group consisting of supplemental weighting agents, fluid loss control agents, lost circulation control agents, surfactants, antifoaming agents, and combinations of these.

Another aspect includes any of the previous aspects, in which the surfactants comprise at least one of sulfonated polymers, sulfonated alkanes, polycarboxylated ethers, trimethylalkylammonium salts, alkylbenzylammonium salts, proteins, polyethylene glycol derivatives, oligosaccharides, or cholesterol derivatives.

Another aspect includes any of the previous aspects, in which the drilling fluid comprises at least one of natural oil, synthetic oil, diesel oil, mineral oil, hydrogenated olefins, unhydrogenated olefins, poly-alpha olefins, linear olefins, branched olefins, polydiorganosiloxanes, siloxanes, organosiloxanes, esters, ethers, acetals, dialkylcarbonates, hydrocarbons, fatty acids, esters of fatty acids, straight chain, branched or cyclical alkyl ethers of fatty acids, and combinations of these.

Another aspect includes any of the previous aspects, in which the drilling fluid comprises at least one of fresh water, salt water, brine, municipal water, formation water, produced water, well water, filtered water, distilled water, sea water, or combinations of these.

Another aspect includes any of the previous aspects, in which the dispersed nanoparticles increases the Newtonian viscosity of the drilling fluid with the dispersed nanoparticles versus a similar or equivalent drilling fluid without the dispersed nanoparticles by from 5 to 2000 cP.

Another aspect includes any of the previous aspects, in which the dispersed nanoparticles increases the plastic viscosity of the drilling fluid with the dispersed nanoparticles versus a similar or equivalent drilling fluid without the dispersed nanoparticles by 10%.

Another aspect includes any of the previous aspects, in which the dispersed nanoparticles increases the yield point of the drilling fluid with the dispersed nanoparticles versus a similar or equivalent drilling fluid without the dispersed nanoparticles by 10%.

Another aspect includes any of the previous aspects, in which the dispersed nanoparticles increases a 10-second gel strength of the drilling fluid with the dispersed nanoparticles versus a similar or equivalent drilling fluid without the dispersed nanoparticles by 10%.

Another aspect includes any of the previous aspects, in which the dispersed nanoparticles increases a 10-minute gel strength of the drilling fluid with the dispersed nanoparticles versus a similar or equivalent drilling fluid without the dispersed nanoparticles by 10%.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of suspending at least one weighting agent in a drilling fluid comprising:
  synthesizing carbon nanotubes via chemical vapor deposition on iron oxide catalyst nanoparticles to form a quantity of nanoparticles, in which individual nanoparticles of the iron oxide catalyst nanoparticles comprise a transition metal disposed on iron oxide and in which individual nanoparticles of the iron oxide catalyst nanoparticles comprise 10 wt. % or less transition metal as calculated by a weight of the iron oxide;

adding the quantity of nanoparticles to the drilling fluid, forming dispersed nanoparticles; and adding at least one weighting agent to the drilling fluid after the addition of the quantity of nanoparticles, in which:

at least one of a Newtonian viscosity, a yield point, a plastic viscosity, and a density value of the drilling fluid is greater with the presence of the dispersed nanoparticles compared to an equivalent drilling fluid without the dispersed nanoparticles, an amount of suspended weighting agent in the drilling fluid is increased with the presence of the dispersed nanoparticles compared to the equivalent drilling fluid without the dispersed nanoparticles, and the weighting agent is chosen from the group consisting of barite, hematite, lime, calcium carbonate, bentonite, montmorillonite clay, siderite, ilmenite, hausmannite, ferrosilicon, manganese oxide, mullite, kaolinite, aluminum oxide, silicon carbide, tungsten carbide, and combinations of these.

2. The method of claim 1, in which the transition metal comprises Fe, Co, or Ni.

3. The method of claim 2, in which the iron oxide comprises iron(II) oxide, iron(III) oxide or combinations of these.

4. The method of claim 1, in which the carbon nanotubes are adsorbed onto the iron oxide catalyst nanoparticles.

5. The method of claim 1, further comprising functionalizing a surface of the carbon nanotubes with at least one of carboxylates, ammonium derivatives, sulfonated monomers, oligomers, or polymers, after adding the quantity of nanoparticles to the drilling fluid.

6. The method of claim 1, in which synthesizing carbon nanotubes via chemical vapor deposition on iron oxide catalyst nanoparticles comprises diffusing carbon atoms through the carbon nanotubes.

7. The method of claim 1, in which synthesizing carbon nanotubes via chemical vapor deposition on iron oxide catalyst nanoparticles comprises diffusing carbon atoms along a surface of individual nanoparticles of the iron oxide catalyst nanoparticles.

8. The method of claim 1, in which the drilling fluid comprises a polar aprotic solvent.

9. The method of claim 8, in which the polar aprotic solvent comprises at least one of n-alkyl pyrrolidone, dimethylformamide, or dimethylsulfoxide.

10. The method of claim 1, in which the drilling fluid comprises one or more additives selected from the group consisting of supplemental weighting agents, fluid loss control agents, lost circulation control agents, surfactants, antifoaming agents, and combinations of these.

11. The method of claim 10, in which the surfactants comprise at least one of sulfonated polymers, sulfonated alkanes, polycarboxylated ethers, trimethylalkylammonium salts, alkylbenzylammonium salts, proteins, polyethylene glycol derivatives, oligosaccharides, or cholesterol derivatives.

12. The method of claim 1, in which the drilling fluid comprises at least one of natural oil, synthetic oil, diesel oil, mineral oil, hydrogenated olefins, unhydrogenated olefins, poly-alpha olefins, linear olefins, branched olefins, polydiorganosiloxanes, siloxanes, organosiloxanes, esters, ethers, acetals, dialkylcarbonates, hydrocarbons, fatty acids, esters of fatty acids, straight chain, branched or cyclical alkyl ethers of fatty acids, and combinations of these.

13. The method of claim 1, in which the drilling fluid comprises at least one of fresh water, salt water, brine, municipal water, formation water, produced water, well water, filtered water, distilled water, sea water, or combinations of these.

14. The method of claim 1, in which the dispersed nanoparticles increases the Newtonian viscosity of the drilling fluid with the dispersed nanoparticles versus a similar or equivalent drilling fluid without the dispersed nanoparticles by from 5 to 2000 cP.

15. The method of claim 1, in which the dispersed nanoparticles increases the plastic viscosity of the drilling fluid with the dispersed nanoparticles versus a similar or equivalent drilling fluid without the dispersed nanoparticles by 10%.

16. The method of claim 1, in which the dispersed nanoparticles increases the yield point of the drilling fluid with the dispersed nanoparticles versus a similar or equivalent drilling fluid without the dispersed nanoparticles by 10%.

17. The method of claim 1, in which the dispersed nanoparticles increases a 10-second gel strength of the drilling fluid with the dispersed nanoparticles versus a similar or equivalent drilling fluid without the dispersed nanoparticles by 10%.

18. The method of claim 1, in which the dispersed nanoparticles increases a 10-minute gel strength of the drilling fluid with the dispersed nanoparticles versus a similar or equivalent drilling fluid without the dispersed nanoparticles by 10%.

* * * * *